No. 613,626. Patented Nov. 1, 1898.
J. F. GILLILAND.
BOX ASSEMBLING MACHINE.
(Application filed Aug. 6, 1897.)
(No Model.)
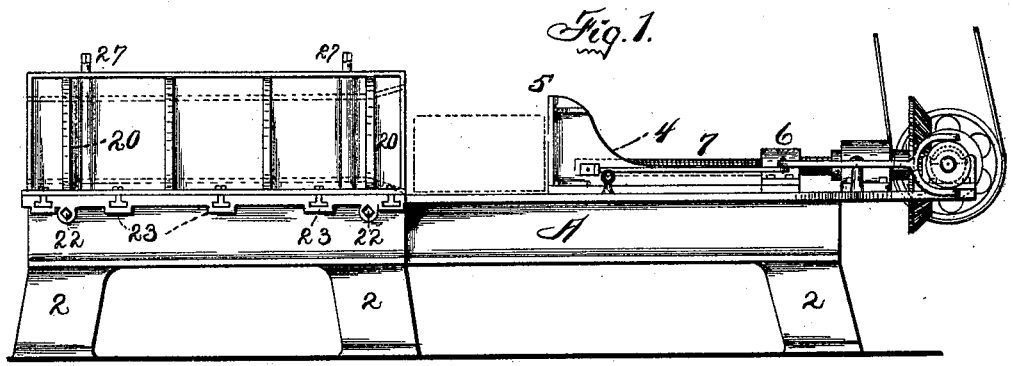
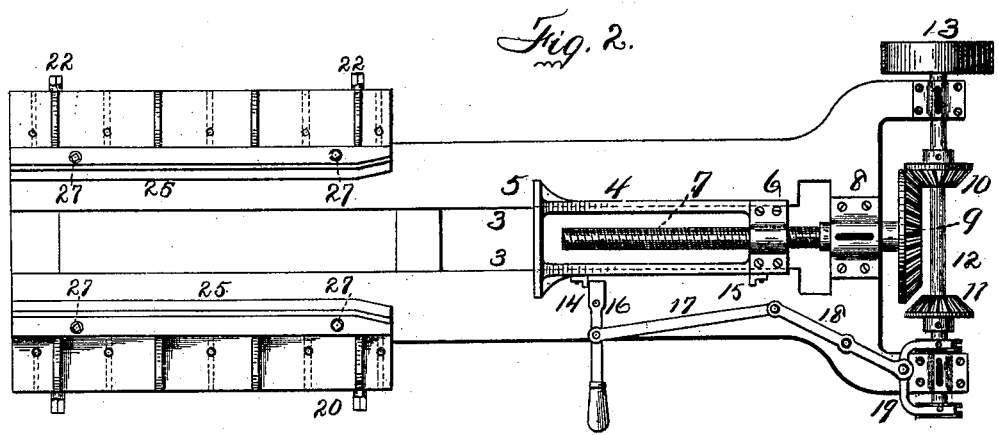
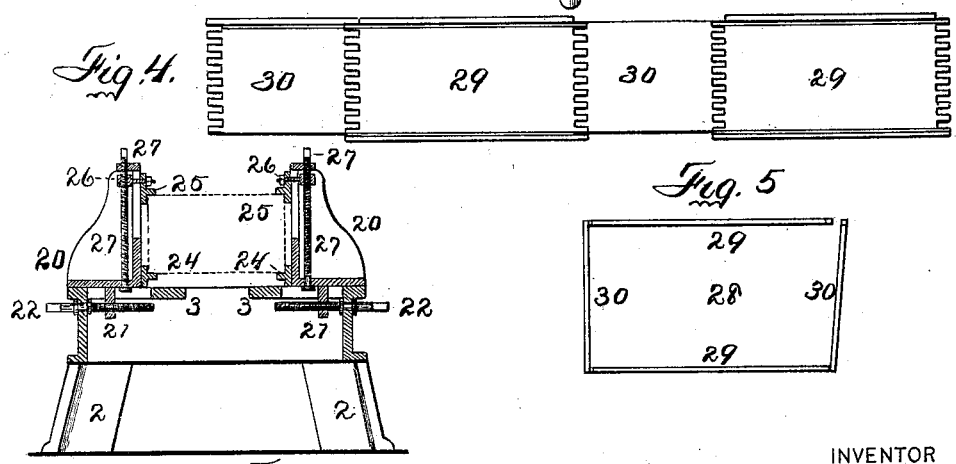
WITNESSES:
Charles W. Marvin
Mary A. Franklin
INVENTOR
James F. Gilliland.
BY
Smith & Benson
ATTORNEYS.
THE NORRIS PETERS CO., PHOTO-LITHO., WASHINGTON, D. C.

UNITED STATES PATENT OFFICE.

JAMES F. GILLILAND, OF ADRIAN, MICHIGAN, ASSIGNOR, BY MESNE ASSIGNMENTS, TO DAVID A. NEASE, OF PITTSBURG, PENNSYLVANIA.

BOX-ASSEMBLING MACHINE.

SPECIFICATION forming part of Letters Patent No. 613,626, dated November 1, 1898.

Application filed August 6, 1897. Serial No. 647,306. (No model.)

*To all whom it may concern:*

Be it known that I, JAMES F. GILLILAND, of Adrian, in the county of Lenawee, in the State of Michigan, have invented new and useful Improvements in Box-Assembling Machines, of which the following, taken in connection with the accompanying drawings, is a full, clear, and exact description.

My invention relates to box-machines, and particularly to machines or apparatus used in assembling the ends and sides and shaping the box-body to a true rectangle, and to the art of making boxes in which said machine may be used.

My object is to produce a machine for this purpose comprising a suitable bed, vertical, parallel, and adjustable walls erected thereon, provided with guides outwardly flaring at their ends to create a tapered throat or entrance into the assembling or compression chamber between said vertical walls, a reciprocating plunger, and a driving mechanism automatically reversed by the movement of the plunger and by which the members of a box-body are brought or forced together to make their meeting joints and to be secured. When previously glued, they are retained in said chamber between said walls while the glue is setting. It is constructed as follows, reference being had to the accompanying drawings, in which—

Figure 1 is a side elevation of the machine. Fig. 2 is a top plan. Fig. 3 is a vertical section transverse to the assembling-chamber. Fig. 4 is a plan view of the several members of a box-body tongued and grooved at their ends to form corner-joints and showing part of them interlocked. Fig. 5 is a top plan of a partly-formed box-body ready to be placed upon the table to be forced into the assembling-chamber to complete the corner-jointing and glue-setting or other fastening.

A is a suitable bed upon suitable supports 2 and provided with suitable parallel ways 3, which carry and guide the reciprocating plunger 4, provided with a head 5 and a stationary nut 6, interiorly threaded to receive the screw 7, which is suitably journaled at 8 and is driven by a bevel-gear 9, which is driven by one or the other of the bevel-gears 10 11 upon the sliding shaft 12, according to whether it is desired to advance or retract said plunger, said shaft being driven by power applied to the drive-pulley 13 and journaled upon said bed substantially as shown.

Upon the side of the plunger tappets 14 15 are mounted adjustably in any suitable manner, each adapted to engage with a shifting lever 16 to actuate the draw-bar 17 and swing the lever 18 upon its pivot, and the fork 19, which is suitably connected to the shaft 12 and whereby it is shifted to bring one or the other of said gears 10 or 11 into mesh with the gear 9. When the tappet 15 engages the lever 16, the draw-bar 17 and swinging lever 18 are thrown to the position shown in Fig. 2 of the drawings, thereby throwing the fork 19 upward, so as to move the beveled gear 11 out of engagement with the gear 9, when the movement of the machine stops. The operator by moving the lever 16 throws the beveled gear into engagement with the gear 9, thereby reversing the screw 7, so as to impart the movement in the opposite direction to the plunger. Then when the tappet engages the arm 16 the draw-bar 17 and lever 18 are thrown in an opposite direction, and the fork 19 by moving the shaft 12 endwise throws the beveled gear 10 out of engagement, when the machine again stops.

Upon the bed standards 20 are mounted, each provided with an ear 21, receiving an adjusting-screw 22, and with suitable T's which enter the ways 23 in the bed.

A rib 24 is secured upon the lower part of the inner face of each standard. A parallel rib 25 is also mounted thereon by means of bolts 26 and a screw 27, by which it is vertically adjusted and set. The front ends of these ribs are beveled off outwardly, so as to create a tapering throat or entrance for the box-body 28, partly put together, having its side and end members 29 and 30 prepared to make a joint with each other, such as the tongue-and-groove joint, as shown in Fig. 4.

In using the above machine the parts of the box having notched ends, as shown in Fig. 4, are placed with said notched ends, said ends having first been glued, loosely in engagement with each other in the manner shown in Fig. 5, and the box thus roughly assembled is placed between the plunger and the ends of the channel formed by the parts 24 24 25 25. The motion of the plunger toward the channel then forces all the pieces evenly and simultaneously into the contracting channel, thus bringing the notch-joints into close engagement and completing the assembling of the box-frame.

Having described my invention, what I claim, and desire to secure by Letters Patent, is—

1. That improvement in the art of making glue-joint boxes, which consists in placing the box side blanks with their glued-together and grooved edges in loose engagement to form the general outline of the box, and forcing said side blanks through a gradually-contracting channel, having bearing-walls adjacent the corners of the box, substantially as set forth.

2. That improvement in the art of making glue-joint boxes which consists in providing box side blanks with edge notches, supplying such notched edges with glue or other adhesive material, placing them to form the outline of the box with the notched edges loosely engaging each other and then forcing them through a gradually-contracting channel having bearing-walls adjacent to the corners of the box substantially as described.

3. That improvement in the art of making glue-joint boxes which consists in placing the box side blanks with their notched and glued edges in loose engagement before a channel or way having guides embracing the corner edges of the box on both sides of the edge and arranged to gradually contract, and forcing all of the sides with an even regular motion through said channel thereby bringing the edge of the box into intimate relation and securing a close joint for all the corners.

4. In a box-making machine the combination with the supporting-bed of lateral walls having a base-flange mounted on said bed and screws for adjusting said walls toward and from each other, two guide-strips of angular cross-section mounted on the opposing face of each wall and right and left hand screws for adjusting said strips toward and from each other the forward ends of said strips beveled to form a flaring passage between them and a plunger facing said passage and reciprocated by means of a screw reversely driven by alternate engagement with beveled gears on a driving-shaft, said driving-shaft mounted to slide transversely of the screw and automatically shifted to disengage one beveled gear or the other with said screw by levers one of which is struck by straps on said plunger at the end of its range of movement in either direction.

In witness whereof I have hereunto set my hand this 27th day of July, 1897.

JAMES F. GILLILAND.

In presence of—
GEORGE A. DONNEL,
HOWARD P. DENISON.